(12) United States Patent
Nozasa et al.

(10) Patent No.: US 7,501,738 B2
(45) Date of Patent: Mar. 10, 2009

(54) PIEZOELECTRIC TRANSDUCER DRIVE CIRCUIT AND COLD CATHODE TUBE LIGHTING DEVICE HAVING THE SAME

(75) Inventors: Yuji Nozasa, Kyoto (JP); Yusaku Yoshimatsu, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 175 days.

(21) Appl. No.: 10/599,389

(22) PCT Filed: Aug. 11, 2005

(86) PCT No.: PCT/JP2005/014723
§ 371 (c)(1), (2), (4) Date: Sep. 27, 2006

(87) PCT Pub. No.: WO2006/016640
PCT Pub. Date: Feb. 16, 2006

(65) Prior Publication Data
US 2007/0182282 A1    Aug. 9, 2007

(30) Foreign Application Priority Data
Aug. 13, 2004  (JP) .............................. 2004-235720

(51) Int. Cl.
H01L 41/08 (2006.01)
(52) U.S. Cl. ................................. 310/316.01
(58) Field of Classification Search ............ 310/316.01, 310/317, 319
See application file for complete search history.

(56) References Cited

FOREIGN PATENT DOCUMENTS

| JP | 09-107684 | 4/1997 |
|---|---|---|
| JP | 11-299248 | 10/1999 |
| JP | 2002-186252 | 6/2002 |
| JP | 2003-324962 | 11/2003 |

*Primary Examiner*—Mark Budd
(74) *Attorney, Agent, or Firm*—Fish & Richardson P.C.

(57) ABSTRACT

A piezoelectric transducer drive circuit comprising a variable current source being controlled by a differential operational amplifier, a constant current source and a switch means connected in series with the variable current source between a power supply voltage $V_{DD}$ and the ground potential, and a capacitor having opposite ends connected with the output of the variable current source and one input terminal of the differential operational amplifier, wherein the switch means takes nonconducting state upon stoppage of applying operation of intermittent operation and takes conducting state at the time of applying operation, and an error reference voltage $V_{REF1}$ takes a first value upon stoppage of intermittent operation and transits gradually to a second value as the operation is started. Overshoot current of a cold cathode ray tube can be deterred when applying operation of intermittent operation is started.

2 Claims, 4 Drawing Sheets

PIEZOELECTRIC TRANSDUCER DRIVE CIRCUIT AND COLD CATHODE TUBE LIGHTING DEVICE HAVING THE SAME

TECHNICAL FIELD

The present invention relates to a piezoelectric transducer drive circuit driving a piezoelectric transducer boosting an alternating voltage applied intermittently to a pair of primary electrodes for outputting the boosted alternating voltage from a secondary electrode, and a cold cathode tube lighting device having the piezoelectric transducer drive circuit.

BACKGROUND ART

Generally, a cold cathode tube is used as a light source of backlight for a liquid crystal panel. To apply a high alternating voltage to the cold cathode tube to light it up, a piezoelectric transducer for example having a pair of primary electrodes and a secondary electrode is used. The brightness of the cold cathode tube can be adjusted by applying a high voltage intermittently at a frequency (for example 200 Hz) lower than the frequency (for example 60 KHz) of the high alternating voltage and controlling the ratio between a period of performing the voltage-applying operation and a period of stopping the voltage-applying operation in the intermittent operation. This technique is called burst dimming, and a circuit implementing this technique is built into a piezoelectric transducer drive circuit driving a piezoelectric transducer (see for example Japanese Patent Laying-Open No. 9-107684 (Patent Document 1)).

FIG. 3 shows such a piezoelectric transducer drive circuit and a cold cathode tube lighting device having the same. A cold cathode tube lighting device 51 includes: a so-called push-pull type piezoelectric transducer drive circuit 55; a piezoelectric transducer 56 driven by piezoelectric transducer drive circuit 55 to boost an alternating voltage applied to a pair of primary electrodes 56a and 56b and output a high voltage from a secondary electrode 56c; a cold cathode tube 57 connected as a load to secondary electrode 56c of piezoelectric transducer 56; and an impedance device 58 connected in series with cold cathode tube 57.

When an alternating voltage is applied to the pair of primary electrodes 56a and 56b, piezoelectric transducer 56 boosts the voltage by piezoelectric effect and outputs a high voltage from secondary electrode 56c. Cold cathode tube 57 lights up when the high voltage output from piezoelectric transducer 56 is applied thereto. FIG. 4 illustrates a boosting ratio of piezoelectric transducer 56 to a frequency of the alternating voltage applied to primary electrodes 56a and 56b, in which a curve A represents the case where a tube current $I_{FL}$ does not flow through cold cathode tube 57 (when cold cathode tube 57 does not light up), and a curve B represents the case where tube current $I_{FL}$ flows through cold cathode tube 57 (when cold cathode tube 57 lights up). The boosting ratio of piezoelectric transducer 56 depends on the frequency, and when cold cathode tube 57 lights up, the boosting ratio has a peak at a resonance frequency $f_0$. Actually, the boosting ratio is used at a frequency $f_1$ which is near and slightly higher than resonance frequency $f_0$. Tube current $I_{FL}$ is subjected to feedback control by impedance device 58 and piezoelectric transducer drive circuit 55 such that the alternating voltage applied to primary electrodes 56a and 56b is set to have frequency $f_1$.

Piezoelectric transducer drive circuit 55 includes: a detection circuit (CDET) 61 detecting a signal of impedance device 58 as a signal indicating the state of the load connected to secondary electrode 56c and outputting a peak voltage or an average voltage thereof; an error amplification circuit 62 comparing the output voltage of detection circuit 61 supplied via a detection voltage input terminal EIN with an error reference voltage $V_{REF1}$ and outputting a voltage according to a difference therebetween from an oscillation-controlling voltage output terminal EOUT; a voltage-controlled oscillator (VCO) 63 controlled by the output voltage of error amplification circuit 62 and outputting an oscillation clock CLK having a reference frequency (for example about 120 KHz) and a triangular wave signal T1 in synchronization with oscillation clock CLK; an applied voltage detection circuit (VDET) 65 detecting the alternating voltage applied to primary electrode 56a of piezoelectric transducer 56 supplied after being attenuated by an attenuator 64 including resistors connected in series, and outputting a peak voltage or an average voltage thereof; a second error amplification circuit 66 comparing the output voltage of applied voltage detection circuit 65 supplied to its inverting input terminal with a second error reference voltage $V_{REF2}$ supplied to its non-inverting input terminal, and amplifying and outputting a differential voltage; a PWM comparator 67 comparing the output voltage of the second error amplification circuit 66 supplied to its non-inverting input terminal with triangular wave signal T1 of voltage-controlled oscillator 63 supplied to its inverting input terminal, and outputting a PWM signal; an AND circuit 68 having one input terminal supplied with the PWM signal of PWM comparator 67 and the other input terminal supplied with an intermittent signal BURST output from a burst comparator 80 which will be described later; a P-type MOS transistor 70 having a gate supplied with an output signal of AND circuit 68 via an inverting buffer 69, and a source connected to a driving power supply voltage $V_{CC}$; a frequency divider (DIV) 71 dividing the frequency of oscillation clock CLK of voltage-controlled oscillator 63 for output; an N-type MOS transistor 73 having a gate supplied with the output of frequency divider 71 via a buffer 72, a source grounded, and a drain connected to primary electrode 56a of piezoelectric transducer 56; an N-type MOS transistor 75 having a gate supplied with the output of frequency divider 71 via an inverting buffer 74, a source grounded, and a drain connected to primary electrode 56b of piezoelectric transducer 56; an inductor 76 having one end connected to the drain of N-type MOS transistor 73 and the other end connected to the drain of P-type MOS transistor 70 described above; an inductor 77 having one end connected to the drain of N-type MOS transistor 75 and the other end connected to the drain of P-type MOS transistor 70; and a fly wheel diode 78 having a cathode connected to the drain of P-type MOS transistor 70 and an anode grounded.

Further, piezoelectric transducer drive circuit 55 includes: an oscillator (OSC) 79 having an input terminal BCNT supplied with a control voltage $V_{BCNT}$ for adjusting the brightness of cold cathode tube 57, and outputting a triangular wave signal T2 having a frequency at which a high voltage is intermittently applied (for example 200 Hz); and burst comparator 80 comparing triangular wave signal T2 of oscillator 79 supplied to its non-inverting input terminal with control voltage $V_{BCNT}$ supplied to its inverting input terminal and outputting intermittent signal BURST. Intermittent signal BURST output from burst comparator 80 is supplied to error amplification circuit 62 described above via an intermittent signal input terminal BIN.

The operation of piezoelectric transducer drive circuit 55 will now be described. Tube current $I_{FL}$ flowing through cold cathode tube 57 is detected by impedance device 58 and converted to a voltage signal. The voltage signal is then detected by detection circuit 61, and its peak voltage or average voltage is output. The output voltage of detection circuit 61 is compared with error reference voltage $V_{REF1}$ in error amplification circuit 62, and a voltage according to the difference between the two voltages is output. Voltage-controlled oscillator 63 is controlled by the output voltage of error amplification circuit 62, and outputs oscillation clock CLK having the reference frequency according to the voltage as well as triangular wave signal T1. Triangular wave signal T1 output from voltage-controlled oscillator 63 is compared with the output voltage of the second error amplification circuit 66 in PWM comparator 67. The resulting PWM signal is output from PWM comparator 67, supplied via AND circuit 68 to inverting buffer 69 for inversion, and then supplied to the gate of P-type MOS transistor 70. On the other hand, oscillation clock CLK output from voltage-controlled oscillator 63, having its frequency divided by frequency divider 71, is supplied via buffer 72 and inverting buffer 74 to the gate of N-type MOS transistor 73 and the gate of N-type MOS transistor 75, to turn the two transistors ON and OFF alternately. When N-type MOS transistor 73 is turned ON and P-type MOS transistor 70 is turned ON, a current flows from driving power supply voltage $V_{CC}$ to inductor 76 to store energy. When N-type MOS transistor 73 is turned OFF in a next cycle, a voltage according to the stored energy is generated and applied to primary electrode 56a of piezoelectric transducer 56. Further, when N-type MOS transistor 73 is turned OFF and N-type MOS transistor 75 is turned ON, and P-type MOS transistor 70 is turned ON, a current flows from driving power supply voltage $V_{CC}$ to inductor 77 to store energy. When N-type MOS transistor 75 is turned OFF in a next cycle, a voltage according to the stored energy is generated and applied to primary electrode 56b of piezoelectric transducer 56.

Accordingly, in response to oscillation clock CLK output from voltage-controlled oscillator 63, the two N-type MOS transistors 73 and 75 are alternately turned ON and OFF, applying an alternating voltage to primary electrodes 56a and 56b of piezoelectric transducer 56. In addition, for example, if tube current $I_{FL}$ flowing through cold cathode tube 57 is higher than a predetermined value, the frequency of oscillation clock CLK from voltage-controlled oscillator 63 is increased, and the frequency of the alternating voltage applied to primary electrodes 56a and 56b of piezoelectric transducer 56 is also increased. In contrast, if tube current $I_{FL}$ flowing through cold cathode tube 57 is lower than the predetermined value, the frequency of the alternating voltage applied to primary electrodes 56a and 56b of piezoelectric transducer 56 is reduced. Thereby, tube current $I_{FL}$ flowing through cold cathode tube 57 is fed back to control the frequency of the alternating voltage applied to primary electrodes 56a and 56b of piezoelectric transducer 56.

Further, the alternating voltage applied to primary electrode 56a of piezoelectric transducer 56 is attenuated by attenuator 64, and detected by applied voltage detection circuit 65 to output its peak voltage or average voltage. Then, the output voltage of applied voltage detection circuit 65 is compared with the second error reference voltage $V_{REF2}$ by the second error amplification circuit 66, and the difference between the two voltages is amplified and output. As described above, the output voltage is compared with triangular wave signal T1 of voltage-controlled oscillator 63 in PWM comparator 67. These circuits are provided to maintain the alternating voltage applied to primary electrodes 56a and 56b of piezoelectric transducer 56 constant to suppress the effect of variation in driving power supply voltage $V_{CC}$.

Next, the control of the intermittent operation will be described. When triangular wave signal T2 output from oscillator (OSC) 79 has a voltage higher than control voltage $V_{BCNT}$ of input terminal BCNT, intermittent signal BURST output from burst comparator 80 is in a high level, and when triangular wave signal T2 has a voltage lower than control voltage $V_{BCNT}$, intermittent signal BURST is in a low level. When intermittent signal BURST is in a high level, piezoelectric transducer drive circuit 55 is in the state of performing the voltage-applying operation (lighting operation), lighting up cold cathode tube 57. In contrast, when intermittent signal BURST is in a low level, P-type MOS transistor 70 is always turned OFF via AND circuit 68, and thus piezoelectric transducer drive circuit 55 is in the state of stopping the voltage-applying operation (stopping lighting), turning cold cathode tube 57 off. This intermittent operation is periodically performed at the frequency of triangular wave signal T2, that is, the frequency of intermittent signal BURST.

Next, referring to FIG. 5, details of error amplification circuit 62 shown in FIG. 3 will be described. In FIG. 5, the error amplification circuit is designated by a numeral 101. Error amplification circuit 101 has detection voltage input terminal EIN supplied with the output voltage of detection circuit (CDET) 61 for tube current $I_{FL}$; intermittent signal input terminal BIN supplied with intermittent signal BURST output from burst comparator 80; and oscillation-controlling voltage output terminal EOUT outputting an oscillation-controlling voltage controlling voltage-controlled oscillator (VCO) 63. An inverting input terminal of a comparator 111 is connected to detection voltage input terminal EIN, and constant error reference voltage $V_{REF1}$ is input to a non-inverting input terminal of comparator 111. Then, comparator 111 compares the output voltage of detection circuit 61 with error reference voltage $V_{REF1}$ and outputs a signal in a high level or a low level according to the comparison result. A control terminal of a switch means 113 is connected to an output of comparator 111. A constant current source 112 on the side of ground is connected to one input terminal of switch means 113, and a constant current source 115 on the side of a power supply voltage $V_{DD}$ is connected to the other input terminal of switch means 113. When the control terminal is in a low level, switch means 113 allows an output terminal and one input terminal to electrically conduct with each other, and when the control terminal is in a high level, switch means 113 allows the output terminal and the other input terminal to electrically conduct with each other. One end of another switch means 116 is connected to the output terminal of switch means 113. Switch means 116 has a control terminal to which intermittent signal input terminal BIN is connected, and the other end to which oscillation-controlling voltage output terminal EOUT and one end of a capacitor 114 are connected, the other end of capacitor 114 being grounded. Switch means 116 becomes nonconductive when the control terminal is in a low level, and becomes conductive when the control terminal is in a high level.

Next, an operation of error amplification circuit 101 will be described. Intermittent signal input terminal BIN is supplied with a signal in a low level when the voltage-applying operation is stopped in the intermittent operation, and it is supplied with a signal in a high level when the voltage-applying operation is performed in the intermittent operation. Switch means 116 is conductive when the voltage-applying operation is performed in the intermittent operation. When detection voltage input terminal EIN has a voltage lower than error reference voltage $V_{REF1}$, capacitor 114 is charged by constant current source 115, increasing the voltage of oscillation-controlling voltage output terminal EOUT. When the voltage of oscillation-controlling voltage output terminal EOUT is increased, an oscillation frequency of voltage-controlled oscillator 63 is reduced, increasing tube current $I_{FL}$. In contrast, when detection voltage input terminal EIN has a voltage higher than error reference voltage $V_{REF1}$, capacitor 114 is discharged by constant current source 112, decreasing the voltage of oscillation-controlling voltage output terminal EOUT. When the voltage of oscillation-controlling voltage output terminal EOUT is decreased, the oscillation frequency of voltage-controlled oscillator 63 is increased, reducing tube current $I_{FL}$. Accordingly, when the voltage-applying operation is stably performed (when a sufficient period of time has passed since the voltage-applying operation is started), voltage-controlled oscillator 63 oscillates at a frequency according to the voltage of oscillation-controlling voltage output terminal EOUT such that the voltage of detection voltage input terminal EIN matches with error reference voltage $V_{REF1}$. When the voltage-applying operation is stopped in the intermittent operation, switch means 116 becomes nonconductive, and capacitor 114 maintains the voltage obtained when the voltage-applying operation is stably performed, in order to oscillate voltage-controlled oscillator 63 when the voltage-applying operation in the intermittent operation is started again, at a frequency before the voltage-applying operation is stopped.

Patent Document 1: Japanese Patent Laying-Open No. 9-107684

DISCLOSURE OF THE INVENTION

Problems to be Solved by the Invention

When the cold cathode tube lighting device described above is observed in detail, in reality the voltage of detection voltage input terminal EIN is substantially 0 V in a short period of time immediately after the voltage-applying operation is started, and thus a current flows from constant current source 115 to capacitor 114 for a certain period, transitionally increasing the voltage of the capacitor. As a result, the frequency of voltage-controlled oscillator 63 varies, and tube current $I_{FL}$ of cold cathode tube 57 transitionally becomes excessive as shown in FIG. 6 (an overshoot current).

Although the overshoot current has little effect on the brightness when the voltage-applying period in the intermittent operation is long, it has a considerable effect when the voltage-applying period is short, that is, the brightness of cold cathode tube 57 is low. Specifically, even if control voltage $V_{BCNT}$ supplied to piezoelectric transducer drive circuit 55 is increased in an attempt to lower the brightness, a desired brightness cannot be obtained precisely. Further, since the overshoot current increases stress on cold cathode tube 57, it may shorten the life of cold cathode tube 57.

The present invention has been made in view of the situation described above, and one object of the present invention is to provide a piezoelectric transducer drive circuit capable of suppressing an overshoot current when a voltage-applying operation is started, and a cold cathode tube lighting device capable of obtaining a desired low brightness precisely using the piezoelectric transducer drive circuit.

Means for Solving the Problems

To solve the problems described above, a piezoelectric transducer drive circuit in accordance with the present invention is a piezoelectric transducer drive circuit driving a piezoelectric transducer boosting an alternating voltage applied intermittently to a pair of primary electrodes and outputting the boosted alternating voltage from a secondary electrode, including: a detection circuit detecting a signal indicating a state of a load connected to the secondary electrode and outputting a peak voltage or an average voltage thereof; an error amplification circuit comparing the output voltage of the detection circuit with an error reference voltage and outputting a voltage according to a difference therebetween; and a voltage-controlled oscillator controlled by the output voltage of the error amplification circuit and generating a clock determining a frequency of the alternating voltage applied to the primary electrodes, wherein the error amplification circuit controls the voltage-controlled oscillator such that, when a voltage-applying operation is stopped in an intermittent operation and thereafter the voltage-applying operation is started, the frequency of the alternating voltage is always gradually reduced from a high point and stabilized.

Preferably, in the piezoelectric transducer drive circuit, the error amplification circuit includes: a differential operational amplifier comparing the output voltage of the detection circuit supplied to one input terminal via a resistor with the error reference voltage supplied to the other input terminal, amplifying a differential voltage, and outputting the amplified differential voltage; a variable current source controlled by the differential operational amplifier; a constant current source and a switch means connected in series with the variable current source between a power supply voltage and a ground voltage; and a capacitor having opposite ends connected to an output of the variable current source and to the one input terminal of the differential operational amplifier. The switch means becomes nonconductive when the voltage-applying operation is stopped in the intermittent operation, and becomes conductive when the voltage-applying operation is performed; and the error reference voltage has a first value when the voltage-applying operation is stopped in the intermittent operation, and gradually transits to a second value when the voltage-applying operation is started.

According to another aspect of the present invention, there is provided a cold cathode tube lighting device including a piezoelectric transducer drive circuit driving a piezoelectric transducer boosting an alternating voltage applied intermittently to a pair of primary electrodes and outputting the boosted alternating voltage from a secondary electrode, and the piezoelectric transducer drive circuit includes: a detection circuit detecting a signal indicating a state of a load connected to the secondary electrode and outputting a peak voltage or an average voltage thereof; an error amplification circuit comparing the output voltage of the detection circuit with an error reference voltage and outputting a voltage according to a difference therebetween; and a voltage-controlled oscillator controlled by the output voltage of the error amplification circuit and generating a clock determining a frequency of the alternating voltage applied to the primary electrodes, the error amplification circuit controlling the voltage-controlled oscillator such that, when a voltage-applying operation is stopped in an intermittent operation and thereafter the voltage-applying operation is started, the frequency of the alternating voltage is always gradually reduced from a high point and stabilized. The cold cathode tube lighting device further includes: the piezoelectric transducer driven by the piezoelectric transducer drive circuit to boost the alternating voltage applied intermittently to the pair of primary electrodes and outputting the alternating voltage from the secondary electrode; a cold cathode tube connected as a load to the secondary electrode of the piezoelectric transducer; and an impedance device connected in series with the cold cathode tube to allow the detection circuit of the piezoelectric transducer drive circuit to detect the signal indicating the state of the load connected to the secondary electrode.

Preferably, in the piezoelectric transducer drive circuit, the error amplification circuit includes: a differential operational amplifier comparing the output voltage of the detection circuit supplied to one input terminal via a resistor with the error reference voltage supplied to the other input terminal, amplifying a differential voltage, and outputting the amplified differential voltage; a variable current source controlled by the differential operational amplifier; a constant current source and a switch means connected in series with the variable current source between a power supply voltage and a ground voltage; and a capacitor having opposite ends connected to an output of the variable current source and to the one input terminal of the differential operational amplifier. The switch means becomes nonconductive when the voltage-applying operation is stopped in the intermittent operation, and becomes conductive when the voltage-applying operation is performed; and the error reference voltage has a first value when the voltage-applying operation is stopped in the intermittent operation, and gradually transits to a second value when the voltage-applying operation is started.

Effects of the Invention

In the piezoelectric transducer drive circuit in accordance with the present invention, the error amplification circuit controls the voltage-controlled oscillator such that, when the voltage-applying operation is stopped in the intermittent operation and thereafter the voltage-applying operation is started, the frequency of the alternating voltage applied to the piezoelectric transducer is always gradually reduced from a high point and stabilized. Consequently, a tube current is gradually increased, and thus an overshoot current can be suppressed. Further, the cold cathode tube lighting device in accordance with the present invention can obtain a desired low brightness precisely because it uses this piezoelectric transducer drive circuit.

DESCRIPTION OF THE REFERENCE SIGNS 1 error amplification circuit, 10 resistor, 11 differential operational amplifier, 12 variable current source, 13 switch means, 14 capacitor, 15 constant current source, $V_{REF1}$ error reference voltage, 51 cold cathode tube lighting device, 55 piezoelectric transducer drive circuit, 56 piezoelectric transducer, 56a, 56b primary electrodes of the piezoelectric transducer, 56c secondary electrode of the piezoelectric transducer, 57 cold cathode tube (load), 58 impedance device, 61 detection circuit (CDET), 62 error amplification circuit, 63 voltage-controlled oscillator (VCO).

BEST MODES FOR CARRYING OUT THE INVENTION

Figure 1:
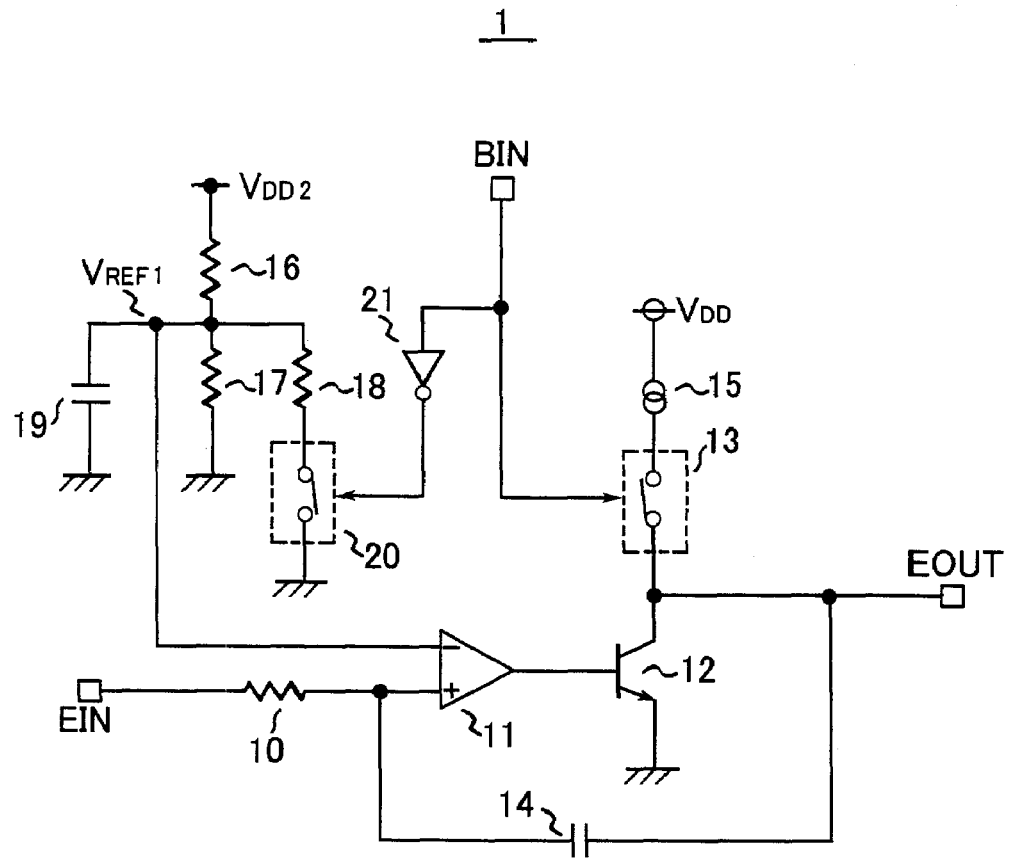
FIG. 1 is a circuit diagram of an error amplification circuit included in a piezoelectric transducer drive circuit in accordance with an embodiment of the present invention.
Figure 3:
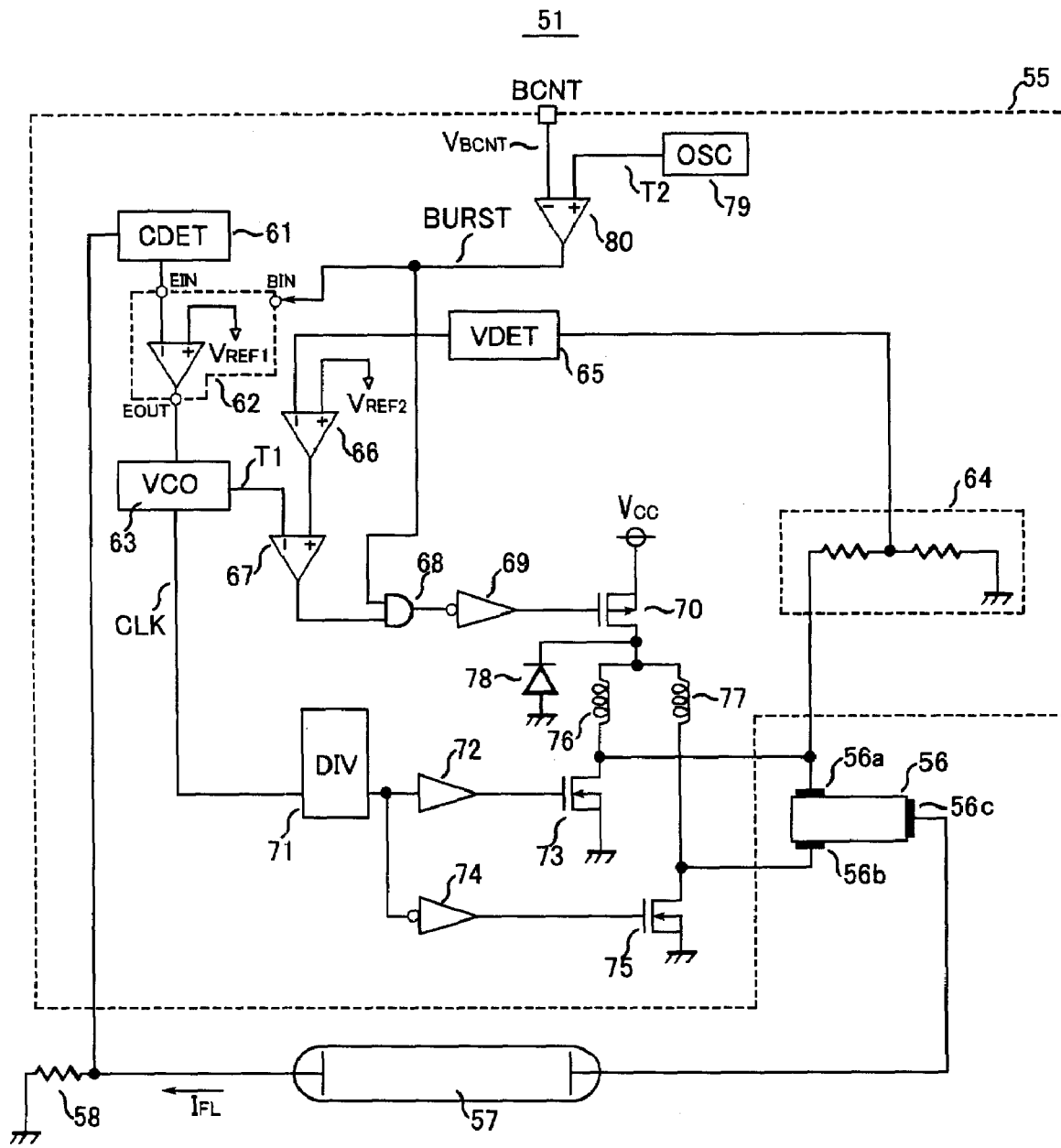
FIG. 3 is a circuit diagram of an overall structure of a piezoelectric transducer drive circuit and a cold cathode tube lighting device having the same.

Hereinafter, an embodiment of the present invention will be described with reference to the drawings. A piezoelectric transducer drive circuit and a cold cathode tube lighting device having the same in accordance with an embodiment of the present invention is characterized by an error amplification circuit, and its overall structure will not be described here since it is substantially the same as that illustrated in FIG. 3 described in the section of Background Art. FIG. 1 shows an error amplification circuit used in a piezoelectric transducer drive circuit and a cold cathode tube lighting device having the same in accordance with an embodiment of the present invention. Consequently, the piezoelectric transducer drive circuit and the cold cathode tube lighting device having the same in accordance with an embodiment of the present invention includes an error amplification circuit 1 instead of error amplification circuit 62 in FIG. 3.

Error amplification circuit 1 has a detection voltage input terminal EIN supplied with an output voltage of detection circuit (CDET) 61 for tube current $I_{FL}$; an intermittent signal input terminal BIN supplied with intermittent signal BURST output from burst comparator 80; and an oscillation-controlling voltage output terminal EOUT outputting an oscillation-controlling voltage controlling voltage-controlled oscillator (VCO) 63. A non-inverting input terminal of a differential operational amplifier 11 is connected to detection voltage input terminal EIN via a resistor 10, and error reference voltage $V_{REF1}$ is supplied to an inverting input terminal of differential operational amplifier 11. Then, differential operational amplifier 11 compares the output voltage of detection circuit 61 with error reference voltage $V_{REF1}$, and amplifies and outputs a differential voltage. A base of an NPN-type transistor 12 is connected to an output of differential operational amplifier 11, and an emitter of NPN-type transistor 12 is grounded. Transistor 12 serves as a variable current source controlled by differential operational amplifier 11. To a collector of transistor 12, that is, to an output of variable current source 12 is connected oscillation-controlling voltage output terminal EOUT, one end of a switch means 13, and one end of capacitor 14. The other end of capacitor 14 is connected to the non-inverting input terminal of differential operational amplifier 11. The other end of switch means 13 is connected to one end of a constant current source 15, and the other end of constant current source 15 is connected to a power supply voltage $V_{DD}$. Specifically, constant current source 15, switch means 13, and variable current source 12 are connected in series between power supply voltage $V_{DD}$ and a ground potential. Intermittent signal input terminal BIN is connected to a control terminal of switch means 13. When a signal in a low level is input to the control terminal, switch means 13 becomes nonconductive, and when a signal in a high level is input to the control terminal, switch means 13 becomes conductive (the same is true for a second switch means 20 which will be described later).

Resistors 16, 17, and 18 and a capacitor 19 are connected to a node of error reference voltage $V_{REF1}$. The other end of resistor 16 is connected to a second power supply voltage $V_{DD2}$ which is down converted from power supply voltage $V_{DD}$, the other end of resistor 18 is connected to one end of the second switch means 20 having the other end grounded, and the other end of resistor 17 and the other end of capacitor 19 are grounded. Further, an output of an inverter 21 is connected to a control terminal of the second switch means 20, and intermittent signal input terminal BIN is connected to an input of inverter 21. Error reference voltage $V_{REF1}$ has a first value (for example 0.1 V) when the second switch means 20 is conductive, and has a second value (for example 1 V) when the second switch means 20 is nonconductive. Further, resistor 18 is set to have a resistance value lower than that of resistor 17, and the first value is set lower than the second value.

Figure 2:
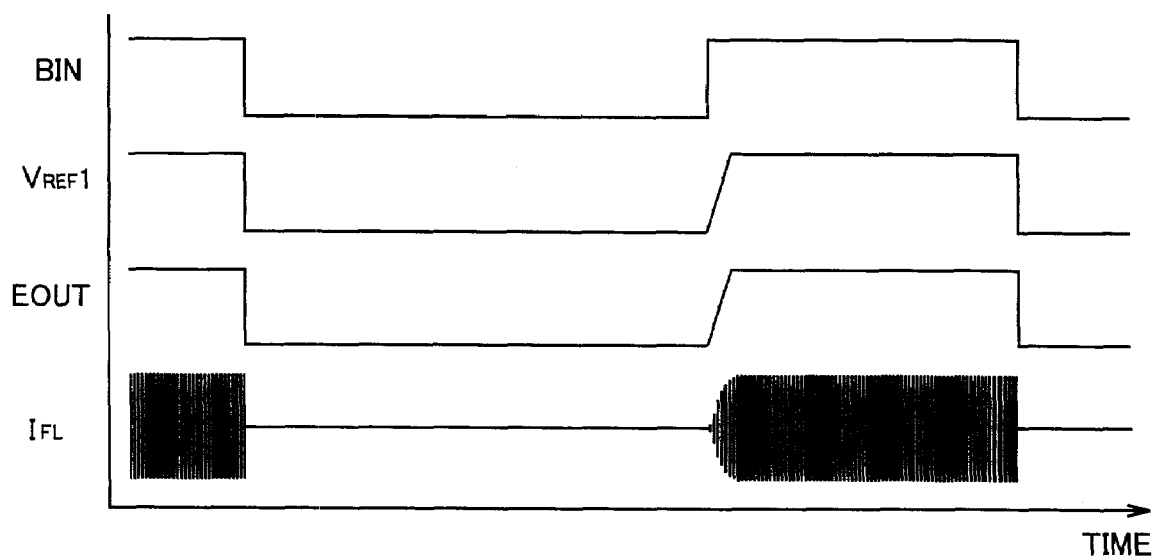
FIG. 2 is a waveform diagram of each portion in FIG. 1.

Next, referring to the waveform diagram in FIG. 2, an operation of error amplification circuit 1 will be described. Intermittent signal input terminal BIN is supplied with a signal in a low level when the voltage-applying operation is stopped in the intermittent operation, and it is supplied with a signal in a high level when the voltage-applying operation is performed in the intermittent operation. Switch means 13 is conductive and the second switch means 20 is nonconductive when the voltage-applying operation is performed in the intermittent operation. Accordingly, error reference voltage $V_{REF1}$ has the second value (for example 1 V), and error amplification circuit 1 performs operation as an integrator in which a time constant is determined by a resistance value of resistor 10 and a capacitance value of capacitor 14. Specifically, when the voltage of detection voltage input terminal EIN is lower than the second value (for example 1 V), the voltage of oscillation-controlling voltage output terminal EOUT is gradually increased, and when it is higher than the second value, the voltage of oscillation-controlling voltage output terminal EOUT is gradually decreased. Accordingly, when the voltage-applying operation is stably performed (when a sufficient period of time has passed since the voltage-applying operation is started), subsequent voltage-controlled oscillator 63 oscillates at a frequency according to the voltage of oscillation-controlling voltage output terminal EOUT such that the voltage of detection voltage input terminal EIN matches with the second value (for example 1 V).

When the voltage-applying operation is stopped in the intermittent operation, switch means 13 becomes nonconductive, and the second switch means 20 becomes conductive. Accordingly, error reference voltage $V_{REF1}$ has the first value (for example 0.1 V), and at the same time the voltage of oscillation-controlling voltage output terminal EOUT is decreased. In response to the decrease in the voltage of oscillation-controlling voltage output terminal EOUT, the voltage of the non-inverting input terminal of differential operational amplifier 11 is also decreased via capacitor 14. Since variable current source 12 is turned OFF when the voltage of the non-inverting input terminal of differential operational amplifier 11 becomes lower than the voltage of the inverting input terminal, the voltage of the non-inverting input terminal is decreased to the first value (for example 0.1 V) of error reference voltage $V_{REF1}$. Consequently, the voltage of oscillation-controlling voltage output terminal EOUT is decreased by the difference between the second value (for example 1 V) and the first value (for example 0.1 V) of error reference voltage $V_{REF1}$. Specifically, the voltage of oscillation-controlling voltage output terminal EOUT varies in the same way as error reference voltage $V_{REF1}$, because a charging voltage of capacitor 114 is substantially maintained. Thereafter, tube current $I_{FL}$ stops flowing and the voltage of detection voltage input terminal EIN becomes 0 V. Thereby, the voltage of the non-inverting input terminal of differential operational amplifier 11 becomes 0 V, and the voltage of oscillation-controlling voltage output terminal EOUT is decreased by the difference between the first value (for example 0.1 V) of error reference voltage $V_{REF1}$ and 0 V.

When the voltage-applying operation is started again in the intermittent operation, switch means 13 becomes conductive, and the second switch means 20 becomes nonconductive. Accordingly, error reference voltage $V_{REF1}$ gradually transits from the first value (for example 0.1 V) to the second value (for example 1 V) with a time constant determined by a resistance value of resistor 16 and a capacitance value of capacitor 19. The voltage of oscillation-controlling voltage output terminal EOUT is gradually increased such that the voltage of the non-inverting input terminal of differential operational amplifier 11 matches with this transiting error reference voltage $V_{REF1}$.

Figure 4:
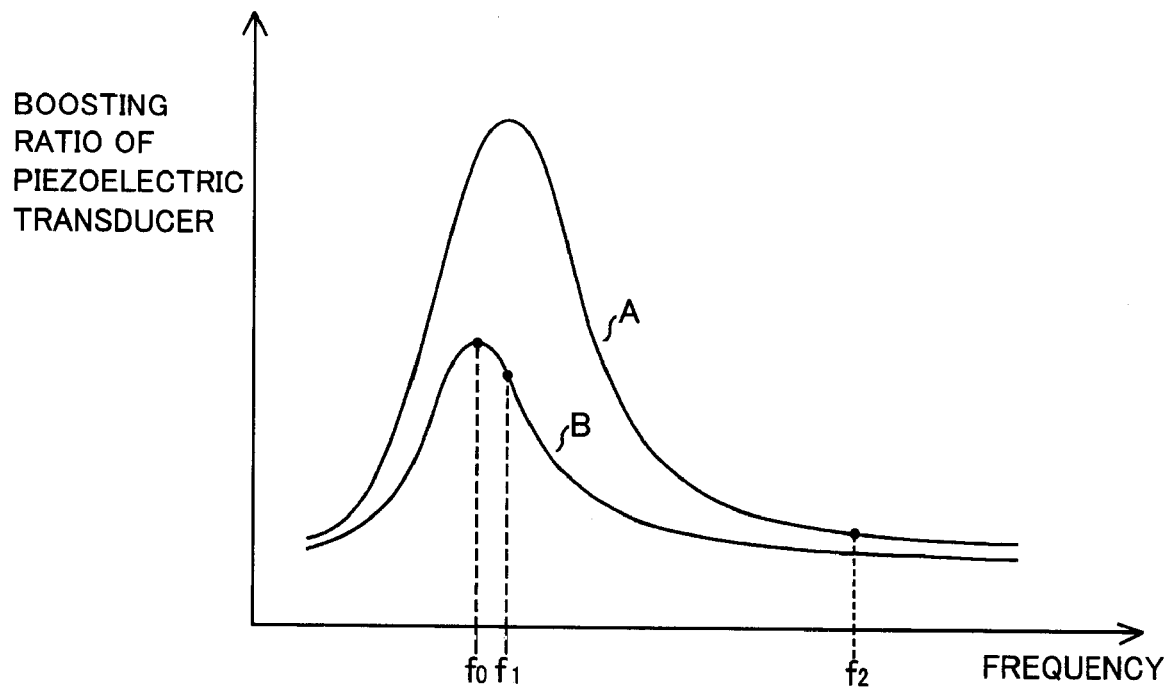
FIG. 4 is a characteristic chart of a piezoelectric transducer.
Figure 5:
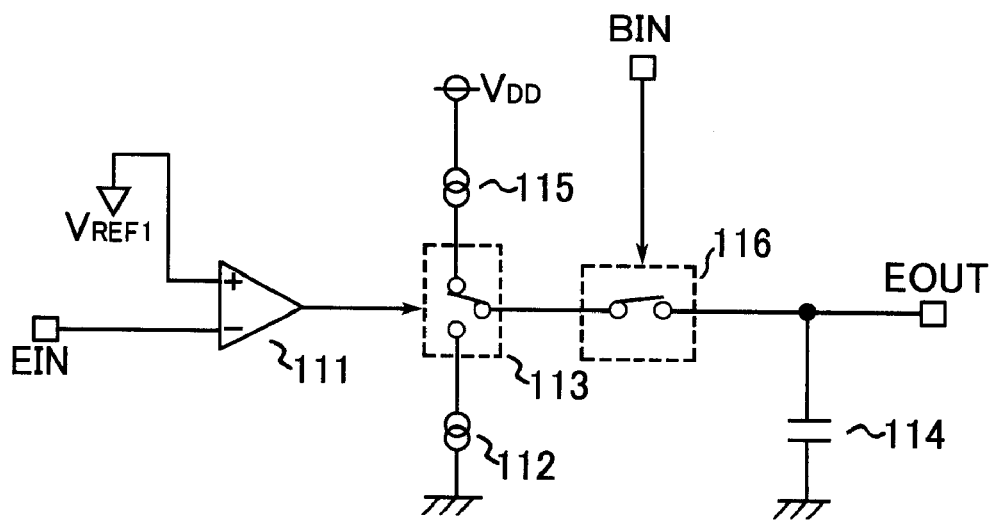
FIG. 5 is a circuit diagram of an error amplification circuit of background art.
Figure 6:
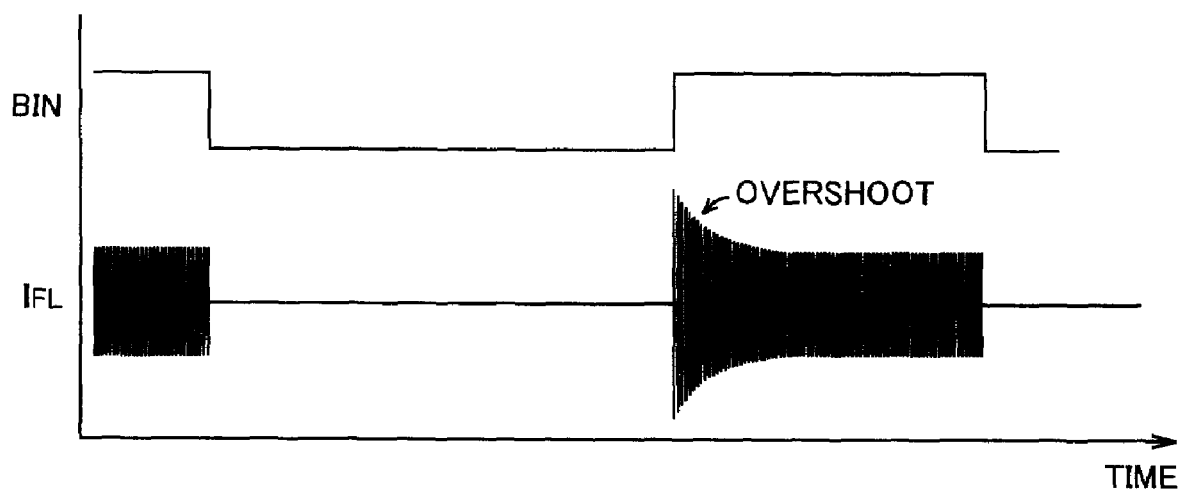
FIG. 6 is a waveform diagram of each portion in FIG. 5.

As the voltage of oscillation-controlling voltage output terminal EOUT is increased from the voltage when the voltage-applying operation is stopped in the intermittent operation to the voltage when the voltage-applying operation is stably performed, the frequency of the alternating voltage applied to primary electrodes 56a and 56b of piezoelectric transducer 56 is gradually reduced from a high point ($f_2$ shown in FIG. 4) and stabilized at a frequency ($f_1$ shown in FIG. 4) used when the voltage-applying operation is stably performed. Therefore, the peak or average value of tube current $I_{FL}$ is gradually increased, and thus no overshoot occurs. As a result, cold cathode tube lighting device 51 can obtain a desired brightness precisely when the brightness is low. Further, stress on the cold cathode tube can be reduced to extend its life.

It is desirable to set the time required for the transition from the first value (for example 0.1 V) to the second value (for example 1V) of error reference voltage $V_{REF1}$ short enough to optimize the resistance value of resistor 16 and the capacitance value of capacitor 19 and cause no overshoot (for example 200 μS), in order to prevent this transit time from adversely affecting the brightness.

Although the piezoelectric transducer drive circuit and the cold cathode tube lighting device having the same in accordance with the embodiment of the present invention has been described, the present invention is not limited to what described in the embodiment, and various design modifications are possible within a range of descriptions in the claims. For example, although the overall structure of the so-called push-pull type piezoelectric transducer drive circuit has been described, the present invention can also be applied to a full-bridge type piezoelectric transducer drive circuit.

It should be considered that the embodiment disclosed herein is by way of example only in all aspects and is not to be taken by way of limitation. The scope of the present invention is set forth by the claims rather than the above description, and is intended to cover all modifications within the meaning and the scope equivalent to those of the claims.

The invention claimed is:

1. A piezoelectric transducer drive circuit to drive a piezoelectric transducer boosting an alternating voltage applied intermittently to a pair of primary electrodes and outputting the boosted alternating voltage from a secondary electrode, the piezoelectric transducer drive circuit comprising:
   a detection circuit to detect a signal indicating a state of a load connected to the secondary electrode and to output one of a peak voltage and an average voltage thereof;
   an error amplification circuit to compare the output voltage of the detection circuit with an error reference voltage and to output a voltage according to a difference therebetween; and
   a voltage-controlled oscillator controlled by the output voltage of the error amplification circuit and arranged to generate a clock determining a frequency of the alternating voltage applied to said primary electrodes,
   wherein said error amplification circuit controls the voltage-controlled oscillator such that, when a voltage-applying operation is stopped in an intermittent operation and thereafter the voltage-applying operation is started, said frequency of the alternating voltage is always gradually reduced from a high point and stabilized and wherein the error amplification circuit includes:

a differential operational amplifier to compare the output voltage of the detection circuit supplied to one input terminal via a resistor with the error reference voltage supplied to the other input terminal, to amplify a differential voltage, and to output the amplified differential voltage;

a variable current source controlled by the differential operational amplifier;

a constant current source and a switch means connected in series with the variable current source between a power supply voltage and a ground voltage; and a capacitor having opposite ends connected to an output of the variable current source and to the one input terminal of the differential operational amplifier, wherein the switch means becomes nonconductive when the voltage-applying operation is stopped in the intermittent operation, and becomes conductive when the voltage-applying operation is performed;

and wherein the error reference voltage has a first value when the voltage-applying operation is stopped in the intermittent operation, and gradually changes to a second value when the voltage-applying operation is started.

2. A cold cathode tube lighting device comprising a piezoelectric transducer drive circuit to drive a piezoelectric transducer boosting an alternating voltage applied intermittently to a pair of primary electrodes and outputting the boosted alternating voltage from a secondary electrode, said piezoelectric transducer drive circuit comprising:

a detection circuit to detect a signal indicating a state of a load connected to the secondary electrode and to output one of a peak voltage and an average voltage thereof;

an error amplification circuit to compare the output voltage of the detection circuit with an error reference voltage and to output a voltage according to a difference therebetween; and a voltage-controlled oscillator controlled by the output voltage of the error amplification circuit and arranged to generate a clock determining a frequency of the alternating voltage applied to said primary electrodes, wherein said error amplification circuit controls the voltage-controlled oscillator such that, when a voltage-applying operation is stopped in an intermittent operation and thereafter the voltage-applying operation is started, said frequency of the alternating voltage is always gradually reduced from a high point and stabilized, wherein said cold cathode tube lighting device further comprises:

the piezoelectric transducer driven by the piezoelectric transducer drive circuit to boost the alternating voltage applied intermittently to the pair of primary electrodes and outputting the boosted alternating voltage from the secondary electrode;

a cold cathode tube connected as a load to the secondary electrode of the piezoelectric transducer; and an impedance device connected in series with the cold cathode tube to allow the detection circuit of the piezoelectric transducer drive circuit to detect the signal indicating the state of the load connected to the secondary electrode, wherein the error amplification circuit comprises:

a differential operational amplifier to compare the output voltage of the detection circuit supplied to one input terminal via a resistor with the error reference voltage supplied to the other input terminal, to amplify a differential voltage, and to output the amplified differential voltage;

a variable current source controlled by the differential operational amplifier;

a constant current source and a switch means connected in series with the variable current source between a power supply voltage and a ground voltage; and a capacitor having opposite ends connected to an output of the variable current source and to the one input terminal of the differential operational amplifier, and wherein the switch means becomes nonconductive when the voltage-applying operation is stopped in the intermittent operation, and becomes conductive when the voltage-applying operation is performed;

and wherein the error reference voltage has a first value when the voltage-applying operation is stopped in the intermittent operation, and gradually changes to a second value when the voltage-applying operation is started.

* * * * *